United States Patent
Bower, III et al.

(10) Patent No.: US 10,263,909 B2
(45) Date of Patent: Apr. 16, 2019

(54) SYSTEM, METHOD, AND COMPUTER PROGRAM FOR MANAGING NETWORK BANDWIDTH BY AN ENDPOINT

(71) Applicant: Lenovo Enterprise Solutions (Singapore) Pte. Ltd., Singapore (SG)

(72) Inventors: Fred Allison Bower, III, Durham, NC (US); Qian QiaoNeng, Shanghai (CN); Andrew Jack Sloma, Austin, TX (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 252 days.

(21) Appl. No.: 15/167,846

(22) Filed: May 27, 2016

(65) Prior Publication Data
US 2017/0346761 A1    Nov. 30, 2017

(51) Int. Cl.
*H04L 12/923*    (2013.01)

(52) U.S. Cl.
CPC .................. *H04L 47/762* (2013.01)

(58) Field of Classification Search
CPC .............. H04L 47/82; H04L 47/762
See application file for complete search history.

(56) References Cited

U.S. PATENT DOCUMENTS

| | | | |
|---|---|---|---|
| 7,181,455 B2 | 2/2007 | Wookey et al. | |
| 2004/0205206 A1* | 10/2004 | Naik | H04L 29/06 709/230 |
| 2006/0106931 A1* | 5/2006 | Richoux | G06F 9/4881 709/226 |
| 2006/0253633 A1 | 11/2006 | Brundridge et al. | |
| 2009/0025004 A1* | 1/2009 | Barnard | G06F 9/50 718/104 |
| 2014/0109102 A1* | 4/2014 | Duncan | G06F 9/3851 718/103 |
| 2015/0006700 A1* | 1/2015 | Wanner | G06F 13/14 709/223 |

OTHER PUBLICATIONS

BMC, BMC MainView for Networks (Mainframe Optimization), MainView for Networks, 2015, pp. 1-2.
Tan et al., A Distributed Throttling Approach for Handling High Bandwidth Aggregates, IEEE Transactions on Parallel and Distributed Systems, vol. 18, No. 7, Jul. 2007, pp. 983-995.
Traffic Shaping, Wikipedia, the Free Encyclopedia, Retrieved From https://en.wikipedia.org/w/index.php?title=Traffic_shaping&oldid=707097295, Last Modified on May 27, 2016, pp. 1-6.

* cited by examiner

*Primary Examiner* — Viet D Vu
(74) *Attorney, Agent, or Firm* — Zilka-Kotab, P.C.

(57) ABSTRACT

A computer program embodied on a tangible computer readable medium includes computer code for identifying a plurality of incomplete tasks by a management server, computer code for determining by the management server, for each of the plurality of incomplete tasks, a priority associated with the task, computer code for determining by the management server an availability of network bandwidth, and computer code for managing, by the management server, the network bandwidth, based on the priority associated with each of the plurality of incomplete tasks and the availability of network bandwidth.

18 Claims, 5 Drawing Sheets

SYSTEM, METHOD, AND COMPUTER PROGRAM FOR MANAGING NETWORK BANDWIDTH BY AN ENDPOINT

FIELD OF THE INVENTION

The present invention relates to distributed management systems, and more particularly to managing tasks initiated on one or more endpoints.

BACKGROUND

In distributed management systems, where a central management server initiates management tasks on a set of endpoints, it is common to have tasks that over-subscribe the network link of the management server when run in parallel against all endpoints. System managers value both throughput (end-to-end time to complete the job on all endpoints) as well as latency (time to complete the job on a specific endpoint). Current network traffic control algorithms do not assist with latency, as they have no application knowledge and cannot infer priority from the packet traffic coming from the management server. There is therefore a need to improve latency at both the management server and managed endpoints.

SUMMARY

A computer program embodied on a tangible computer readable medium includes computer code for identifying a plurality of incomplete tasks by a management server, computer code for determining by the management server, for each of the plurality of incomplete tasks, a priority associated with the task, computer code for determining by the management server an availability of network bandwidth, and computer code for managing, by the management server, the network bandwidth, based on the priority associated with each of the plurality of incomplete tasks and the availability of network bandwidth.

A method includes identifying a plurality of incomplete tasks by a management server, determining by the management server, for each of the plurality of incomplete tasks, a priority associated with the task, determining by the management server an availability of network bandwidth, and managing, by the management server, the network bandwidth, based on the priority associated with each of the plurality of incomplete tasks and the availability of network bandwidth.

A system according to another embodiment includes a processor for identifying a plurality of incomplete tasks by a management server, determining by the management server, for each of the plurality of incomplete tasks, a priority associated with the task, determining by the management server an availability of network bandwidth, and managing, by the management server, the network bandwidth, based on the priority associated with each of the plurality of incomplete tasks and the availability of network bandwidth.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

Figure 1:
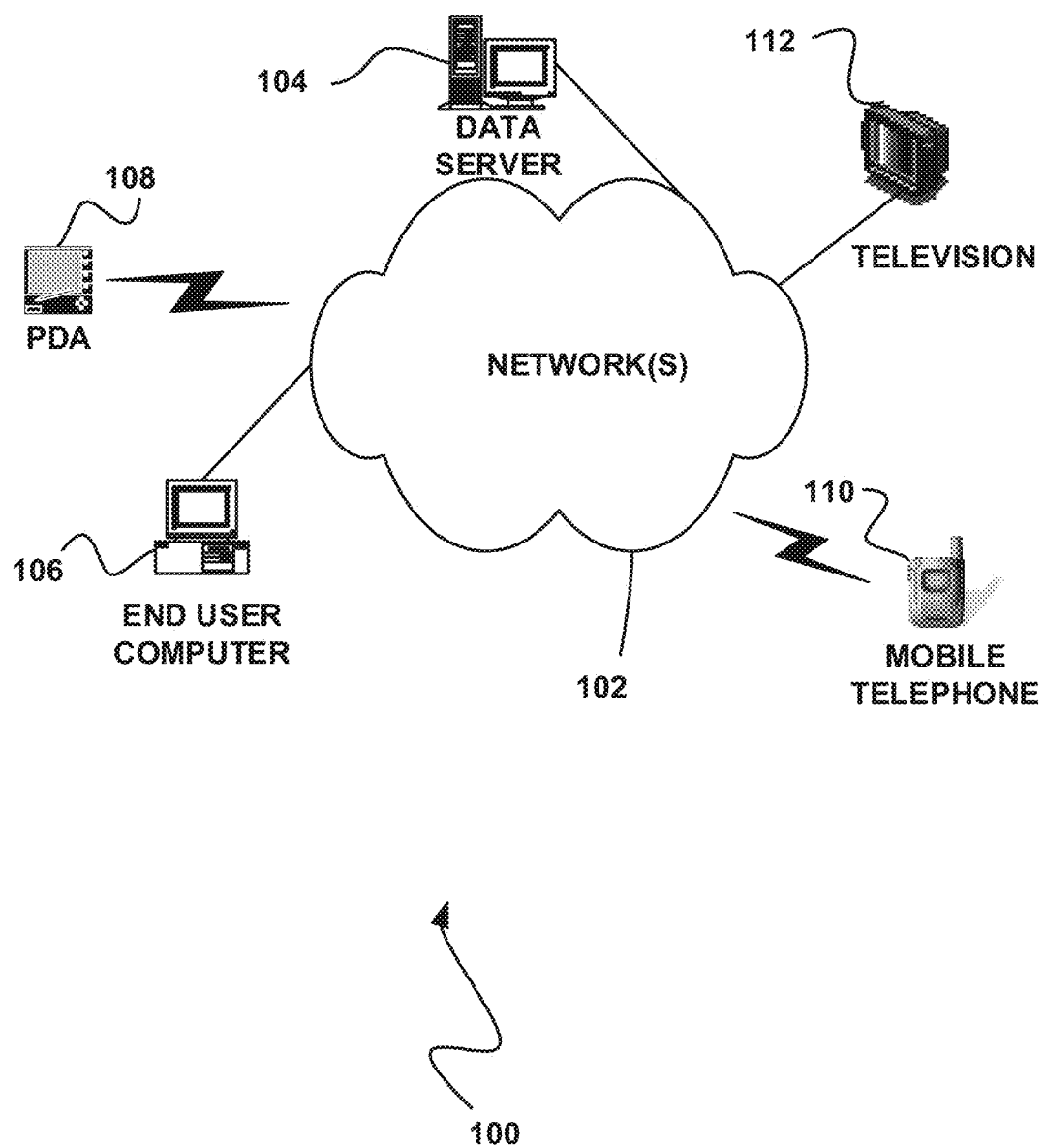
FIG. 1 illustrates a network architecture, in accordance with one possible embodiment.

FIG. 1 illustrates a network architecture 100, in accordance with one possible embodiment. As shown, at least one network 102 is provided. In the context of the present network architecture 100, the network 102 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 102 may be provided.

Coupled to the network 102 is a plurality of devices. For example, a server computer 104 and an end user computer 106 may be coupled to the network 102 for communication purposes. Such end user computer 106 may include a desktop computer, lap-top computer, and/or any other type of logic. Still yet, various other devices may be coupled to the network 102 including a personal digital assistant (PDA) device 108, a mobile phone device 110, a television 112, etc.

Figure 2:
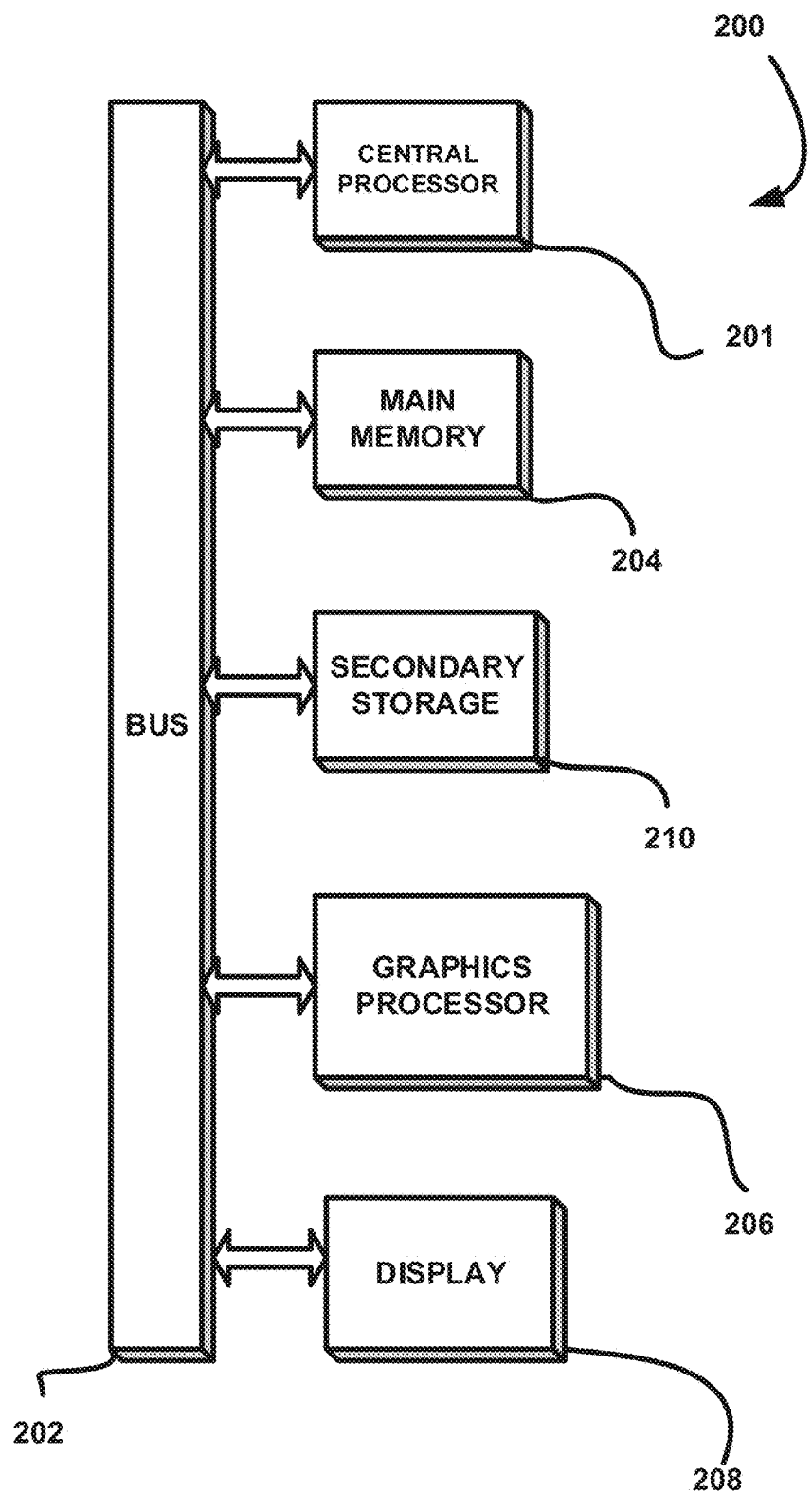
FIG. 2 illustrates an exemplary system, in accordance with one embodiment.

FIG. 2 illustrates an exemplary system 200, in accordance with one embodiment. As an option, the system 200 may be implemented in the context of any of the devices of the network architecture 100 of FIG. 1. Of course, the system 200 may be implemented in any desired environment.

As shown, a system 200 is provided including at least one central processor 201 which is connected to a communication bus 202. The system 200 also includes main memory 204 [e.g. random access memory (RAM), etc.]. The system 200 also includes a graphics processor 206 and a display 208.

The system 200 may also include a secondary storage 210. The secondary storage 210 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 204, the secondary storage 210, and/or any other memory, for that matter. Such computer programs, when executed, enable the system 200 to perform various functions (to be set forth below, for example). Memory 204, storage 210, volatile or non-volatile storage, and/or any other type of storage are possible examples of non-transitory computer-readable media.

Figure 3:
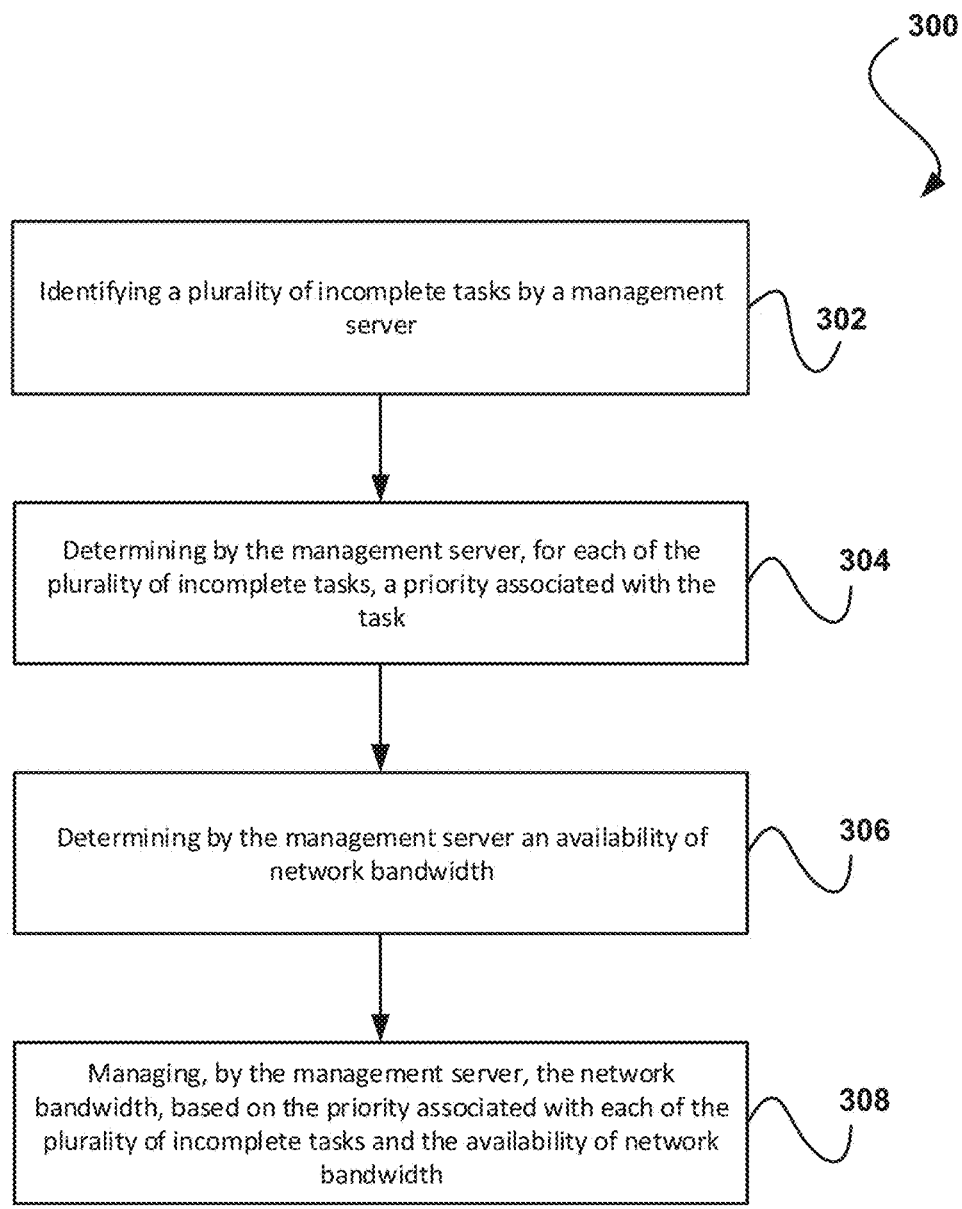
FIG. 3 illustrates a method for managing network bandwidth by an endpoint, in accordance with one embodiment.

FIG. 3 illustrates a method 300 for managing network bandwidth by an endpoint, in accordance with one embodiment. As an option, the method 300 may be carried out in the context of the details of FIGS. 1-2 and 4-5. Of course, however, the method 300 may be carried out in any desired environment. Further, the aforementioned definitions may equally apply to the description below.

As shown in operation 302, a plurality of incomplete tasks are identified by a management server. In one embodiment, the management server may manage a plurality of endpoints, where each of the plurality of endpoints include a computing device such as one or more of a server computer, a network switch, a storage array (e.g., a storage area network (SAN) array, etc). In another embodiment, the management server may include a single central management server in communication with a plurality of endpoints.

Additionally, in one embodiment, the plurality of incomplete tasks may be created at the central management server. For example, the central management server may create the plurality of incomplete tasks and may send them to one or more endpoints. In another embodiment, each of the plurality of incomplete tasks may include one or more actions to be performed over a network, one or more instructions to be implemented at the endpoint and/or over the network, etc. For example, each of the plurality of incomplete tasks may implement a transmission of data on a network between the endpoint and another entity (e.g., the central management server, other endpoints, etc.). In another example, each of the plurality of incomplete tasks may include one or more management tasks (e.g., that manage one or more aspects of the endpoint), one or more maintenance tasks (e.g., that update one or more elements of the endpoint, etc.), one or more operating systems, one or more applications, etc.

Further, in one embodiment, each of the plurality of incomplete tasks may include tasks that are not currently completed on the endpoint, in the network, etc. For example, each of the plurality of incomplete tasks may include tasks that have not been fully implemented on the endpoint, over the network, etc.

Further still, as shown in operation 304, for each of the plurality of incomplete tasks, a priority associated with the task is determined by the management server. In one embodiment, the priority may be assigned by the central management server in communication with the plurality of endpoints. In another embodiment, for each of the plurality of incomplete tasks, a priority associated with the task may be determined by analyzing data associated with the task. For example, metadata may be associated with the task, where the metadata indicates the priority associated with the task.

Additionally, in one embodiment, for each of the plurality of incomplete tasks, the priority associated with the task may be associated with an endpoint to which the task is assigned. For example, each of the plurality of incomplete tasks may be sent to one of a plurality of endpoints, where each of the plurality of endpoints has an associated priority (e.g., a priority assigned by the management server, by an administrator, etc.). In another embodiment, each of the plurality of incomplete tasks may assume the priority of the endpoint to which the incomplete task is assigned.

In yet another embodiment, the priority may include one of a "high" priority and a "low" priority. For example, each of a plurality of endpoints in communication with the central management server may be divided into low priority tasks and high priority tasks. In still another embodiment, the priority for the endpoints may be assigned on a sliding scale (e.g., a scale of 1 to 10, 1 to 100, etc.). Of course, however, the priority may be assigned in any manner.

Also, in one embodiment, for each of the plurality of incomplete tasks, a profile may be determined for the task. For example, a profile may be assigned to each task by the central management server, based on one or more criteria associated with the task. In another example, the criteria may include one or more requirements for implementing the task (e.g., an amount of bandwidth and/or bandwidth time needed to complete the task, etc.), one or more breaks in bandwidth usage during the implementation of the task, etc. In another embodiment, the profile determined for the task may be saved in association with the task. For example, the profile may be saved as metadata in association with the task (e.g., as part of the task data, etc.).

In addition, in one embodiment, the profile determined for the task may be saved for multiple iterations of the task. For example, the profile determined for the task may be associated with the task even after the task has been completed, such that when the task is again instantiated at a later time, the profile remains associated with the task. In another embodiment, the priority may not be based on a profile and may be based on other criteria (e.g., a determined importance of the task, etc.) or may be individually assigned by one or more users.

Furthermore, as shown in operation 306, an availability of network bandwidth is determined by the management server. In one embodiment, the network for which bandwidth is determined may include the network connection by which the management server receives and communicates data (e.g., the network used to transmit and receive data between the plurality of endpoints and the central management server, etc.). In another embodiment, determining the availability of network bandwidth may include determining whether the network connecting the central management server and the plurality of endpoints is fully utilized (e.g., saturated, etc.), or whether some unused bandwidth is currently available on the network connection.

Further still, as shown in operation 308, the network bandwidth is managed by the management server, based on the priority associated with each of the plurality of incomplete tasks and the availability of network bandwidth. In one embodiment, managing the network bandwidth includes increasing a portion of the network bandwidth assigned to a low priority incomplete task (e.g., an incomplete task having a lower priority than at least one other incomplete task, an incomplete task assigned a priority of "low," etc.) by the endpoint, when it is determined that some unused bandwidth is currently available on the network connection.

Also, in one embodiment, managing the network bandwidth includes temporarily decreasing a portion of the network bandwidth assigned to a low priority incomplete task and temporarily increasing a portion of the network bandwidth assigned to a high priority incomplete task (e.g., an incomplete task having a higher priority than at least one other incomplete task, an incomplete task assigned a priority of "high," etc.) by the endpoint, when it is determined that no unused bandwidth is currently available on the network connection (e.g., that the network link is saturated, etc.).

In another embodiment, bandwidth to the low priority incomplete task may be reduced, and bandwidth to the high priority incomplete task may be increased, only if the high priority incomplete task has a current portion of the network bandwidth assigned to it that is below a threshold bandwidth associated with the high priority task (e.g., a maximum bandwidth amount that the high priority incomplete task is capable of utilizing, etc.). In yet another embodiment, if the threshold bandwidth associated with the high priority task is met, no change may be made to the bandwidth assigned to the high priority task.

Also, in one embodiment, temporarily decreasing the portion of the network bandwidth assigned to a low priority incomplete task and temporarily increasing the portion of the network bandwidth assigned to a high priority incomplete task may be performed by the management server using a baseboard management controller (BMC) of an endpoint to bridge management network traffic to the high priority incomplete task. For example, the BMC of the endpoint may throttle the bridge to implement the temporary decreasing of the portion of the network bandwidth assigned to a low priority incomplete task and the temporary increasing of the portion of the network bandwidth assigned to a high priority incomplete task.

Additionally, in one embodiment, a baseboard management controller (BMC) (e.g., an embedded controller located on each endpoint that manages a server, etc.) may be associated with the temporary increasing and decreasing of portions of network bandwidth assigned to tasks, based on the priority associated with each of the plurality of incomplete tasks and the availability of network bandwidth. For example, the management server may control bandwidth allocated to the tasks assigned to each managed endpoint by setting a limit with the BMC for that endpoint to enforce when bridging data from the management network to the endpoint host operating system.

In this way, dynamic network bandwidth adjustments may be made via a management server communicating to a plurality of endpoint BMCs, which may alleviate the central management server by removing bandwidth control from the server side. Additionally, bandwidth control may be simplified and made more efficient. Further, incomplete tasks labeled with a high priority may be provided with as much available bandwidth as possible during the processing of tasks by an endpoint.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
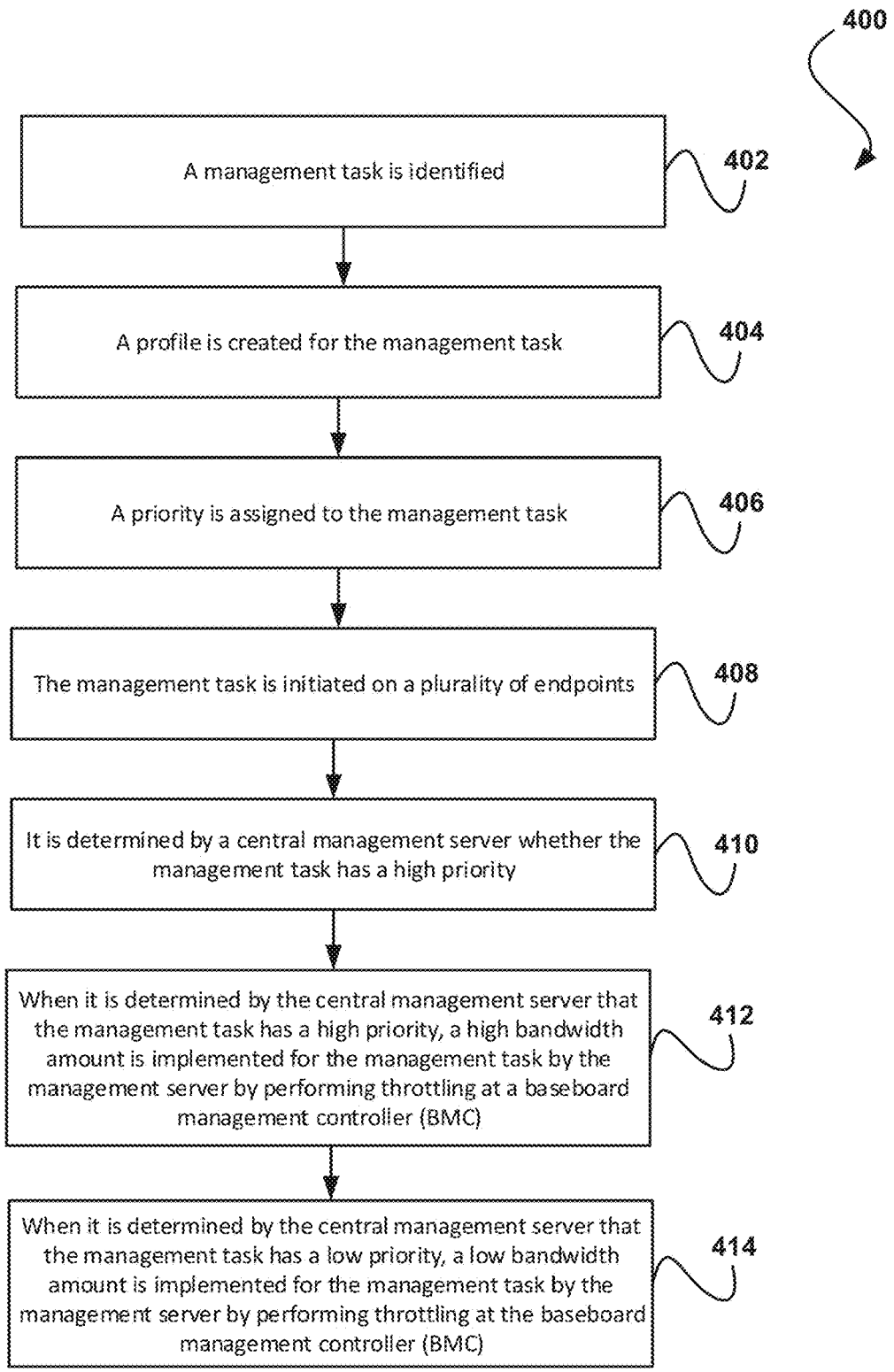
FIG. 4 illustrates a method for creating and distributing management tasks, in accordance with one embodiment.

FIG. 4 illustrates method 400 for creating and distributing management tasks, in accordance with one embodiment. As an option, the method 400 may be carried out in the context of the details of FIGS. 1-3 and 5. Of course, however, the method 400 may be carried out in any desired environment. Further, the aforementioned definitions may equally apply to the description below.

As shown in operation 402, a management task is identified. In one embodiment, the management task may be identified at a central management server. For example, the management task may be created at the central management server, sent to the central management server, etc. In another embodiment, the management task may be one of a plurality of management tasks created by the central management server.

Additionally, as shown in operation 404, a profile is created for the management task. In one embodiment, the profile may be created by the central management server. In another embodiment, the profile may indicate a bandwidth consumption of the management task. For example, the profile may be created by identifying and including in the profile one or more requirements for implementing the management task (e.g., a requirement to transfer a 4 GB file on a 1 Gb/sec network line, etc.). In another example, the profile may be created by identifying and including in the profile an amount of full bandwidth time needed to complete task (e.g., a number of seconds/minutes/hours, etc.). In yet another example, the profile may be created by identifying any breaks in bandwidth usage during the task (e.g., an initial transmission burst of 100 MB with a pause between 3 and 5 minutes and then another 3 MB transmission burst, etc.).

In one embodiment, the profile may serve to inform the management server about consumption patterns for the task, which may be used to dynamically reallocate bandwidth when a high-priority task is in a known low-consumption period of execution. In another embodiment, the profile may be used to ensure that low-priority endpoints are preemptively throttled in anticipation of a pending demand from the higher-priority endpoint's task. In yet another embodiment, the management server may assign a priority modifier to the actual task.

Further, in one embodiment, the identified information may be added as metadata to a profile of the task. In another embodiment, the profile may be stored for multiple iterations of a task (e.g., such that profiling may be performed only once for the management task, even if the task is completed and instantiated again at a later time).

Further still, as shown in operation 406, a priority is assigned to the management task. In one embodiment, the priority may be assigned to the task on one or more of a plurality of endpoints to which the task is assigned and that subsequently implement the task. For example, each endpoint may include one or more devices for which maintenance is performed by the central management server utilizing the management task. In another embodiment, the priority may be based on any criteria (e.g., the priority may be user-assigned, based on an importance to the system, based on the created profile, etc.). In another embodiment, the priority may be indicated by metadata that is stored with the management task. In yet another embodiment, the priority may be obtained from a priority of an endpoint to which the management task is assigned.

Also, as shown in operation 408, the management task is initiated on a plurality of endpoints. In one embodiment, a plurality of instances of the management task may be sent from the central management server to a plurality of endpoints such that the management task is to be implemented on each of the plurality of endpoints. For example, the central management server may deploy an operating system update task to each of a plurality of server endpoints. In another embodiment, the management task may be initiated by an endpoint after being selected from a list (e.g., a server list) within the endpoint. In yet another embodiment, initiating the management task may include setting up a script of activities within the endpoint to implement the task.

In addition, as shown in operation 410, it is determined by a central management server whether the management task has a high priority. In one embodiment, the central management server may identify the priority associated with the management task.

Further, as shown in operation 412, when it is determined by the central management server that the management task has a high priority, a high bandwidth amount is implemented for the management task by the management server by performing throttling at a baseboard management controller (BMC). For example, the high bandwidth amount may include a predefined maximum bandwidth threshold amount, portion, etc. to be assigned to a task. In another example, the BMC may be located on one of the endpoints to which the management task is assigned.

Further still, as shown in operation 414, when it is determined by the central management server that the management task has a low priority, a low bandwidth amount is implemented for the management task by the management server by performing throttling at the baseboard management controller (BMC). For example, the low bandwidth amount may include a predefined minimum bandwidth threshold amount, portion, etc. to be assigned to a task. In one embodiment, one of a plurality of bandwidth levels may be assigned to the management task, based on one of a plurality of priority levels that is associated with the management task.

Also, in one embodiment, for each of the plurality of endpoints, bandwidth may be assigned to a plurality of tasks (e.g., each of a plurality of tasks located in a queue of the endpoints, etc.). In this way, each of a plurality of tasks may be implemented and run on endpoints, and each task may have a priority level and associated bandwidth assigned by the management server and regulated by the management server via BMCs for each of the plurality of endpoints.

Figure 5:
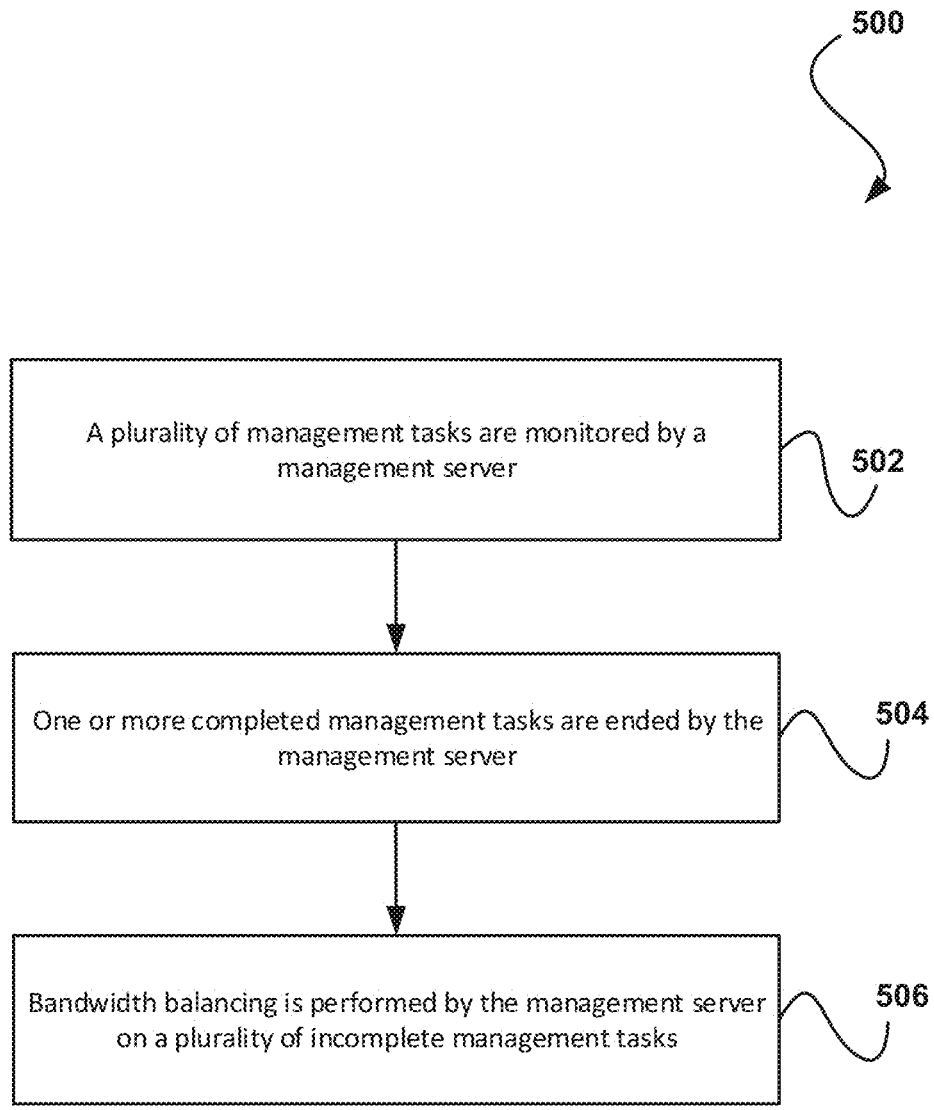
FIG. 5 illustrates a method for balancing bandwidth on an endpoint, in accordance with one embodiment.

FIG. 5 illustrates method 500 for balancing bandwidth on an endpoint, in accordance with one embodiment. As an option, the method 500 may be carried out in the context of the details of FIGS. 1-4. Of course, however, the method 500 may be carried out in any desired environment. Further, the aforementioned definitions may equally apply to the description below.

As shown in operation 502, a plurality of management tasks are monitored by a management server. In one embodiment, a management server may monitor a plurality of management tasks associated with a plurality of endpoints (e.g., management tasks running on the endpoint, etc.).

Additionally, as shown in operation 504, one or more completed management tasks are ended by the management server. In one embodiment, the one or more management tasks may be identified as completed when it is determined by the management server that the one or more management tasks have completed their predefined actions on the endpoint. In another embodiment, once the management server determines that a task is complete, the management task and associated BMC throttling may be ended. For example, the task may be dropped from the pool of tasks and any BMC throttling limitations associated with the task may be removed.

Further, as shown in operation 506, bandwidth balancing is performed by the management server on a plurality of incomplete management tasks. In one embodiment, the bandwidth balancing may be performed by the management server using a baseboard management controller (BMC) for one of the plurality of endpoints, where each of the plurality of endpoints includes a BMC. For example, the BMC may be a specialized service processor that monitors the physical state of its associated endpoint using one or more sensors and that communicates with a central management server via a network connection.

Further still, in one embodiment, performing bandwidth balancing may include determining by the management server whether a connection to the central management server (e.g., a server link, etc.) is fully utilized (e.g., saturated, etc.). In another embodiment, when it is determined by the management server that the connection is not fully utilized, a lower priority task may be given additional bandwidth on the connection to the central management server by the BMC of the endpoint.

In yet another embodiment, when it is determined by the management server that the connection is fully utilized, a higher priority task may be given additional bandwidth on the connection to the central management server by the BMC for each of the plurality of endpoints, and a lower priority task may be given less bandwidth on the connection to the central management server by the BMC for each of the plurality of endpoints. In still another embodiment, a higher priority task may be given additional bandwidth only when the bandwidth currently assigned to the higher priority task is below a predetermined threshold (e.g., the maximum usable bandwidth for the task, etc.).

In this way, latency for high-priority tasks may be improved by implementing a distributed throttle that may be imposed at the BMC for each managed endpoint, where traffic may be bridged between the host and management networks through the BMC. By throttling at this location, scheduling overhead and management complexity may be reduced on the management server and higher priority tasks may be given bandwidth as available in the network based upon throttling the demand from the host-resident worker application.

In one embodiment, management module capability may be leveraged to enable the throttle control on network bridging when certain management tasks are performed. This may provide a simple network allocation policy for certain complicated management tasks like batch OS deployment and firmware updates. For example, a user may trigger a task to multiple endpoints, oversubscribing the server capacity.

Using assigned or derived priority information for the task on targeted endpoints, the server may configure the endpoint BMC to throttle traffic requests back to the server in order to ensure higher-priority endpoints receive maximum available bandwidth. Periodically, the management server may evaluate actual link utilization, and if the high-priority task(s) are not consuming all available bandwidth, lower-priority tasks may be given a higher bandwidth allocation. If the link is saturated, the bandwidth allocation to lower-priority endpoints may be reduced. This may be continued until task completion, at which point BMC throttles may be removed.

In this way, highest-priority tasks may be ensured the lowest latency of task completion in a congested or over-subscribed environment. The delegation of throttling to the endpoint may simplify the process to implement this scheduling technique and may reduce a processing load on the management server.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program embodied on a tangible computer readable medium, comprising:
   computer code for identifying a plurality of incomplete tasks assigned to a plurality of endpoints by a management server;
   computer code for determining by the management server, for each of the plurality of incomplete tasks, a priority associated with the incomplete task;
   computer code for determining by the management server an availability of network bandwidth; and computer code for conditionally adjusting, by the management server, the network bandwidth assigned to one or more of the plurality of incomplete tasks by communicating with one or more baseboard management controllers (BMCs) on the plurality of endpoints, based on the priority associated with each of the plurality of incomplete tasks and the availability of network bandwidth, including temporarily decreasing a portion of the network bandwidth assigned to a low priority incomplete task and temporarily increasing a portion of the network bandwidth assigned to a high priority incomplete task in response to determining that no unused bandwidth is currently available and that a threshold maximum bandwidth associated with the high priority incomplete task is not met.

2. The computer program of claim 1, further comprising computer code for creating a profile for each of the plurality of incomplete tasks, where for each of the plurality of incomplete tasks, the profile indicates a bandwidth consumption of the incomplete task, including:
one or more requirements for implementing the incomplete task,
an amount of full bandwidth time needed to complete the incomplete task, and
one or more breaks in bandwidth usage during the incomplete task;
wherein the profile for the each of the plurality of incomplete tasks is saved for multiple iterations of the incomplete task, such that the profile is associated with the incomplete task after the incomplete task has been completed and is instantiated again.

3. The computer program of claim 1, wherein conditionally adjusting the network bandwidth assigned to one or more of the plurality of incomplete tasks includes setting one or more limits within the one or more BMCs.

4. The computer program of claim 1, wherein conditionally adjusting the network bandwidth assigned to one or more of the plurality of incomplete tasks includes increasing a portion of the network bandwidth assigned to a low priority incomplete task by the management server, in response to determining that unused bandwidth is currently available.

5. The computer program of claim 1, wherein managing the network bandwidth includes temporarily decreasing a portion of the network bandwidth assigned to a low priority incomplete task and temporarily increasing a portion of the network bandwidth assigned to a high priority incomplete task by the management server, in response to determining that no unused bandwidth is currently available on a network connection.

6. The computer program of claim 1, wherein, for each of the plurality of incomplete tasks, the priority associated with each the incomplete task is obtained from a priority of an endpoint to which the incomplete task is assigned.

7. The computer program of claim 1, wherein a portion of the network bandwidth assigned to a low priority incomplete task is temporarily decreased, and a portion of the network bandwidth assigned to a high priority incomplete task is temporarily increased, via the management server communicating with a BMC of an endpoint to bridge management network traffic to the high priority incomplete task.

8. The computer program of claim 7, wherein the BMC of the endpoint is requested by the management server to throttle a bridge to implement the temporary decreasing of the portion of the network bandwidth assigned to the low priority incomplete task and the temporary increasing of the portion of the network bandwidth assigned to the high priority incomplete task.

9. A method, comprising:
identifying a plurality of incomplete tasks assigned to a plurality of endpoints by a management server;
determining by the management server, for each of the plurality of incomplete tasks, a priority associated with the incomplete task;
determining by the management server an availability of network bandwidth; and
conditionally adjusting, by the management server, the network bandwidth assigned to one or more of the plurality of incomplete tasks by communicating with one or more baseboard management controllers (BMCs) on the plurality of endpoints, based on the priority associated with each of the plurality of incomplete tasks and the availability of network bandwidth, including temporarily decreasing a portion of the network bandwidth assigned to a low priority incomplete task and temporarily increasing a portion of the network bandwidth assigned to a high priority incomplete task in response to determining that no unused bandwidth is currently available and that a threshold maximum bandwidth associated with the high priority incomplete task is not met.

10. The method of claim 9, further comprising creating a profile for each of the plurality of incomplete tasks, where for each of the plurality of incomplete tasks, the profile indicates a bandwidth consumption of the incomplete task, including:
one or more requirements for implementing the incomplete task,
an amount of full bandwidth time needed to complete the incomplete task, and
one or more breaks in bandwidth usage during the incomplete task;
wherein a profile for the each of the plurality of incomplete tasks is saved for multiple iterations of the incomplete task, such that the profile is associated with the incomplete task after the incomplete task has been completed and is instantiated again.

11. The method of claim 9, wherein conditionally adjusting the network bandwidth assigned to one or more of the plurality of incomplete tasks includes setting one or more limits within the one or more BMCs.

12. The method of claim 9, wherein conditionally adjusting the network bandwidth assigned to one or more of the plurality of incomplete tasks includes increasing a portion of the network bandwidth assigned to a low priority incomplete task by the management server, in response to determining that unused bandwidth is currently available.

13. The method of claim 9, wherein managing the network bandwidth includes temporarily decreasing a portion of the network bandwidth assigned to a low priority incomplete task and temporarily increasing a portion of the network bandwidth assigned to a high priority incomplete task by the management server, in response to determining that no unused bandwidth is currently available on a network connection.

14. The method of claim 9, wherein, for each of the plurality of incomplete tasks, the priority associated with each the incomplete task is obtained from a priority of an endpoint to which the incomplete task is assigned.

15. The method of claim 9, wherein a portion of the network bandwidth assigned to a low priority incomplete task is temporarily decreased, and a portion of the network bandwidth assigned to a high priority incomplete task is temporarily increased, via the management server communicating with a BMC of an endpoint to bridge management network traffic to the high priority incomplete task.

16. The method of claim 15, wherein the BMC of the endpoint is requested by the management server to throttle a bridge to implement the temporary decreasing of the portion of the network bandwidth assigned to the low priority incomplete task and the temporary increasing of the portion of the network bandwidth assigned to the high priority incomplete task.

17. A system, comprising:
a processor for:
identifying a plurality of incomplete tasks assigned to a plurality of endpoints by a management server;
determining by the management server, for each of the plurality of incomplete tasks, a priority associated with the incomplete task;
determining by the management server an availability of network bandwidth; and
conditionally adjusting, by the management server, the network bandwidth assigned to one or more of the plurality of incomplete tasks by communicating with one or more baseboard management controllers (BMCs) on the plurality of endpoints, based on the priority associated with each of the plurality of incomplete tasks and the availability of network bandwidth, including temporarily decreasing a portion of the network bandwidth assigned to a low priority incomplete task and temporarily increasing a portion of the network bandwidth assigned to a high priority incomplete task in response to determining that no unused bandwidth is currently available and that a threshold maximum bandwidth associated with the high priority incomplete task is not met.

18. The system of claim 17, wherein the processor is coupled to memory via a bus.

* * * * *